United States Patent
Crudgington et al.

(10) Patent No.: US 8,840,113 B2
(45) Date of Patent: *Sep. 23, 2014

(54) BRUSH SEALS

(75) Inventors: Peter Francis Crudgington, Freshford (GB); Aaron Bowsher, Devizes (GB)

(73) Assignee: Cross Manufacturing Company (1938) Limited, Avon (GB)

(*) Notice: Subject to any disclaimer, the term of this patent is extended or adjusted under 35 U.S.C. 154(b) by 0 days.

This patent is subject to a terminal disclaimer.

(21) Appl. No.: 13/358,568

(22) Filed: Jan. 26, 2012

(65) Prior Publication Data

US 2012/0126483 A1    May 24, 2012

Related U.S. Application Data

(60) Continuation of application No. 12/558,068, filed on Sep. 11, 2009, now Pat. No. 8,118,310, which is a division of application No. 11/395,625, filed on Mar. 31, 2006, now abandoned.

(60) Provisional application No. 60/667,475, filed on Apr. 1, 2005.

(51) Int. Cl.
*F16J 15/44* (2006.01)
*F01D 11/00* (2006.01)
*F16J 15/32* (2006.01)

(52) U.S. Cl.
CPC .......... *F01D 11/001* (2013.01); *F05D 2240/56* (2013.01); *F16J 15/3288* (2013.01)
USPC .................................................... 277/355

(58) Field of Classification Search
CPC ...................... F16J 15/3284; F16J 15/3292
USPC .................................................... 277/355
See application file for complete search history.

(56) References Cited

U.S. PATENT DOCUMENTS

| | | | | |
|---|---|---|---|---|
| 5,135,237 A * | 8/1992 | Flower | | 277/355 |
| 5,568,931 A * | 10/1996 | Tseng et al. | | 277/355 |
| 5,752,805 A * | 5/1998 | Gail et al. | | 415/229 |
| 6,293,554 B1 * | 9/2001 | Dinc et al. | | 277/355 |
| 6,390,476 B1 * | 5/2002 | Tong et al. | | 277/355 |
| 6,808,179 B1 * | 10/2004 | Bhattacharyya et al. | | 277/348 |

* cited by examiner

Primary Examiner — Vishal Patel
(74) Attorney, Agent, or Firm — King & Schickli, PLLC

(57) ABSTRACT

A brush seal including a bristle pack mounted in a holder, and having a free end for sealing with a member, a front plate for lying on a high pressure side of the seal and extending part way along the length of the bristle pack to a free end being spaced from the bristle pack characterised in that the front plate is formed for or carries a formation for reducing the influence of swirling fluid on the high pressure side on the bristle pack.

18 Claims, 3 Drawing Sheets

(a)

(b)

(a)　　　　(b)

 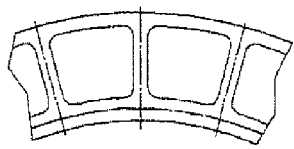 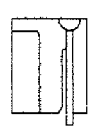 
(a) (b)    (a) (b)
Figure 6    Figure 7
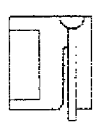  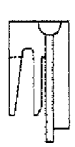 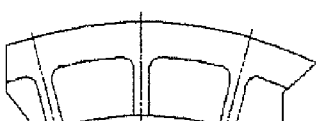
(a) (b)    (a) (b)
Figure 8    Figure 9
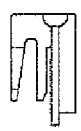 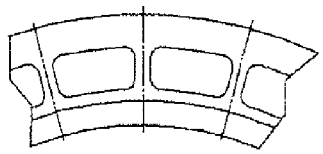 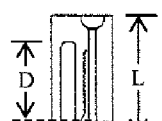 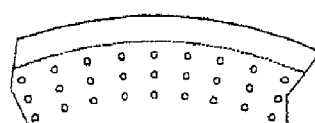
(a) (b)    (a) (b)
Figure 10    Figure 11
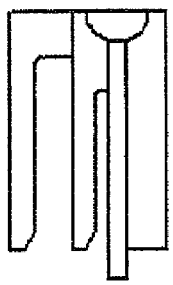 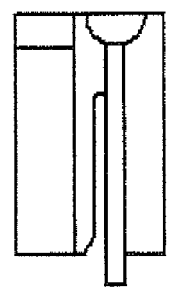
Figure 12    Figure 13

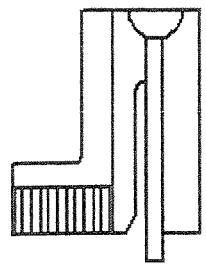
Figure 14
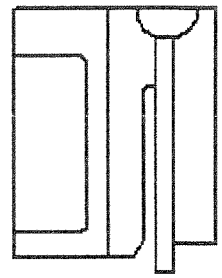
Figure 15
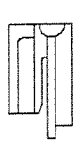 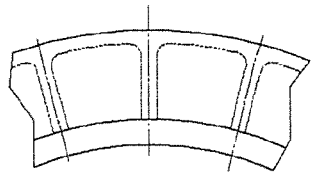
(a) (b)
Figure 16
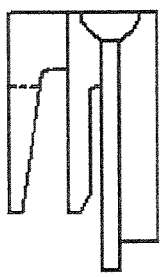
Figure 17
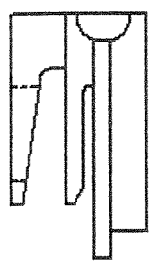
Figure 18
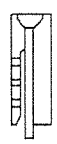 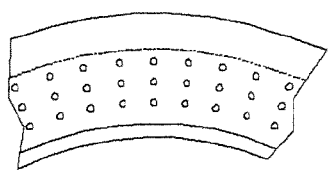
(a) (b)
Figure 19

BRUSH SEALS

This application is a continuation of U.S. patent application Ser. No. 12/558,068, which is a divisional of U.S. patent application Ser. No. 11/395,625, which claims the benefit of U.S. Provisional Patent Application Ser. No. 60/667,475.

FIELD OF THE INVENTION

This invention relates to brush seals and in particular, but not exclusively, to the type of brush seal which is mounted between a static and a rotary member.

BACKGROUND TO THE INVENTION

In the brush seal, for example as are used in gas turbines between the stator and the rotor, it is known that swirling fluid arrives at the brush seal on the high pressure side and this will tend to cause the bristles to be deflected in a generally axial direction at the free ends causing the bristles to bend upwardly away from the rotor. The effect is believed to be dependent on the velocity of the swirling fluid.

As an initial approach to reducing this problem for some time, people have positioned a front plate onto the brush seal assembly, which can have the effect of reducing bristle deflection, but it is only successful to a limited extent, because on current designs there has to be a fairly significant gap between the free end of the front plate and, say, the rotor shaft.

SUMMARY OF THE INVENTION

According to the present invention there is provided a brush seal including a bristle pack mounted in a holder and having a free and for sealing with a member, a front plate for lying on a high pressure side of the seal and extending part of the way along the length of the bristle pack to a free end and being spaced from the bristle pack characterised in that the front plate is formed for or carries a formation for reducing the influence of swirling fluid on the high pressure side of the bristle pack.

In the first case the free end of the front plate maybe thinned, chamfered or otherwise cut away on the side facing the bristle pack. This has proved to have a number of advantages. Firstly the surface area which is engaged between the rotor and the free end, if the two come into contact, is significantly reduced and therefore frictional heat generation is significantly reduced. This means that occasional engagements between the front plate and the rotor are more acceptable and so the design gap between the free end and the rotor can be reduced, Further, because the plate is partly. cut away, it can more readily accommodate bristle deflection, which mainly takes place adjacent the free end of the bristle pack and accordingly the front plate as a whole can be placed nearer the bristle pack, which in turn reduces the detrimental effects of swirling fluids. Another advantage is that with this construction if there is rubbing engagement then any burr, is not likely to hook and retain the bristle pack in the deflected state. In an alternative construction the front plate may be perforated, which will significantly increase the surface area engaged by the swirling gas, removing energy and hence reducing the velocity of the swirling fluid.

Indeed the Applicants have realised that a whole range of formations can be added onto the front plate which serve to increase its surface area and hence reduce the effect of swirling fluid. These formations may be mounted on or be integral with the front plate. The front plate may be longer than the rear plate and can depend/extend lower than the rear plate.

For example the formation may be in the form of a further front plate and define with the existing front plate an intermediate chamber, which may have a depth D of between a quarter and three quarters of the length L of the bristle pack, as is shown in FIG. 11.

Additionally or alternatively the formations may have a plurality of vanes disposed to inhibit flow generally at right angles to the longitudinal direction of the bristle pack. Further the formations may include one or more honeycomb portions and in any of these cases the formation may be shaped and/or configured to increase the surface area of the front plate by at least 50%. In another approach the formation may be a perforated plate mounted on the front plate.

Although the invention has been defined above it is to be understood it includes any inventive combination of the features set out above or in the following description.

BRIEF DESCRIPTION OF THE DRAWINGS

The invention may be performed in various ways and specific embodiments will now be described, by way of example, with reference to the accompanying drawings in which:

FIGS. 2 to 19 are corresponding views of other brush seal constructions with front partial views being shown at (b) in FIGS. 3, 6 to 11, 16 and 19.

DETAILED DESCRIPTION OF THE DRAWINGS

Figure 1:
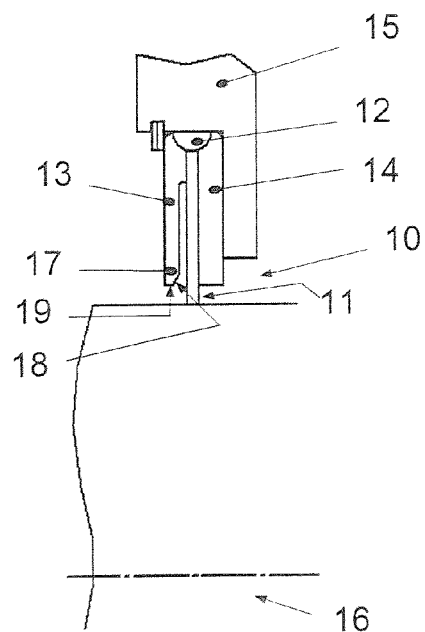
FIG. 1 is a sectional view through a brush seal mounted on a stator and sealing between the stator and a rotor.

In FIG. 1 a brush seal, generally indicated at 10 includes a bristle pack 11 mounted in a holder 12 and having front and rear plates 13 and 14 which are integral or attached to the holder 12. The seal 10 is mounted on a stator 15 and the bristle pack 11 seals with a rotor 16.

The construction of the brush seal 10, and its operation, are essentially conventional except for the fact that the free end 17 of the front plate 13 is chamfered at its rear face. As has been explained already, this enables the front plate 13 to be positioned closed to the bristle pack 11, because the space created by the chamfer 18 allows sufficient room for deflection of the bristles 11 and the narrow face 19 of the free end 17 creates only a small frictional engagement area in the event that the rotor 16 and front plate 13 touch. Accordingly the gap between the narrow face 19 and the rotor 16 can be minimised.

In the embodiment shown in FIGS. 2 to 18, various structures are shown all of which are designed, in particular, to increase the surface area of the seal which is engaged by the swirling fluid, in use. This increases the frictional engagement between the gas and the seal, removing energy from the gas and reducing the velocity of the swirling fluid.

Figure 2:
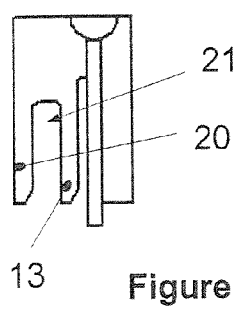

Thus in FIG. 2 formation in the form of an additional front plate 20 is provided. It will be noted that the chamber 21 between the plates 20 and 13 is of significant depth and again this will help to create drag which reduces the swirling of the gas.

Figure 3:
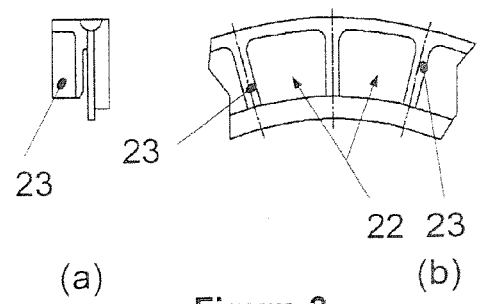

In FIG. 3 the formation takes the form of a series of chambers 22 spaced circumferentially around the seal 10 and separated by walls or vanes 23, which further inhibit circumferential motion of gas in the vicinity of the seal.

Figure 4:
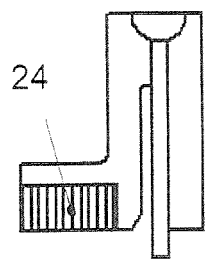
Figure 5:
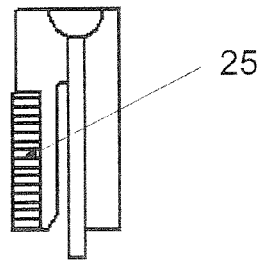

In FIGS. 4 and 5 honeycomb portions 24, 25 respectively, are mounted on the front plate in respective orientations.

FIGS. 6 to 8 are variations on the chamber/vane theme whereas FIGS. 9 and 10 are variants on FIG. 2 but with openings in the front wall 20. FIG. 11 is another variant on FIG. 2, but this time the front wall 24 is perforated. In the embodiment of FIG. 11, the front plate is longer than the rear plate and depends/extends lower than the rear plate. It will be appreciated that the principle of having one of the front/rear plates longer than the other (in particular the front plate being longer) could be applied to other embodiments described herein, e.g. the embodiment of FIG. 1.

FIG. 12 corresponds to FIG. 2 but here the front wall 24 is formed as a separate element and mounted thereon and FIGS. 13 to 18 also show variants of earlier Figures where the formation is mounted onto the seal 10 rather than being an integral part of it.

FIG. 19 shows the front plate 13 being perforated.

We claim:

1. A brush seal, comprising:
   a bristle pack having an end adapted for sealing with a member;
   a front plate for lying on a high pressure side of the seal and extending part way along the length of the bristle pack to a free end being spaced from the bristle pack and a rear plate, wherein the front plate carries a formation with a free end axially spaced from the bristle pack and the free end of the front plate, said formation for reducing the influence of swirling fluid on the high pressure side of the bristle pack, and wherein the formation is formed as a single radial member and is longer in a radial direction than the front plate and the rear plate.

2. A seal as claimed in claim 1 wherein the formation is perforated.

3. A seal as claimed in claim 1 wherein the formation is mounted on or is integral with the front plate.

4. A seal as claimed in claim 1 wherein the single radial member comprises a section including a free end and a portion extending radially outwardly therefrom with a radial length of between a quarter and three quarters of the a length of the bristle pack from an inner diameter to an outer diameter of the bristle pack.

5. A seal as claimed in claim 1 wherein the formation increases the surface area of the front plate by at least 50%.

6. A seal as claimed in claim 1 wherein the formation is a perforated plate.

7. A seal as claimed in claim 1, wherein the free end of the front plate corresponds to the end of the bristle pack and is thinned, chamfered or cut away on the side facing the bristle pack.

8. The seal of claim 1, wherein the front plate is positioned between the formation and the bristle pack.

9. The seal of claim 1, wherein the formation is rigid.

10. A brush seal, comprising:
    a bristle pack adapted for sealing with a member;
    a front plate for lying on a high pressure side of the seal and including a section extending part way along the length of the bristle pack to a free end being spaced from the bristle pack, wherein the front plate comprises a formation with a free end axially spaced from the bristle pack and axially spaced from the free end of the section of the front plate, said formation for reducing the influence of swirling fluid on the high pressure side of the bristle pack, said formation being formed of a single radial member and being longer than the section of the front plate; and
    a rear plate that is shorter in a radial direction than the formation of the front plate.

11. A seal as claimed in claim 10 wherein the front plate is perforated.

12. A seal as claimed in claim 10 wherein the formation is mounted on or is integral with the front plate.

13. A seal as claimed in claim 10 wherein the single radial member comprises a section including a free end and a portion extending radially outwardly therefrom with a radial length of between a quarter and three quarters of the a length of the bristle pack from an inner diameter to an outer diameter of the bristle pack.

14. A seal as claimed in claim 10 wherein the formation increases the surface area of the front plate by at least 50%.

15. A seal as claimed in claim 10 wherein the formation is a perforated plate.

16. A seal as claimed in claim 10, wherein the free end of the front plate corresponds to the end of the bristle pack and is thinned, chamfered or cut away on the side facing the bristle pack.

17. The seal of claim 10, wherein the front plate is positioned between the formation and the bristle pack.

18. The seal of claim 10, wherein the formation is a rigid formation.

* * * * *